(12) United States Patent
Wlodarczyk et al.

(10) Patent No.: US 11,838,140 B2
(45) Date of Patent: Dec. 5, 2023

(54) VERIFYING MEDIA STREAM QUALITY FOR MULTIPARTY VIDEO CONFERENCES

(71) Applicant: DexCare, Inc., Seattle, WA (US)

(72) Inventors: Robert Albert Wlodarczyk, Issaquah, WA (US); Chandler Boone Ferry, Auburn, WA (US); Derek Alan Streat, Seattle, WA (US)

(73) Assignee: DexCare, Inc., Seattle, WA (US)

( * ) Notice: Subject to any disclaimer, the term of this patent is extended or adjusted under 35 U.S.C. 154(b) by 0 days.

(21) Appl. No.: 18/114,916

(22) Filed: Feb. 27, 2023

(65) Prior Publication Data

US 2023/0291592 A1 Sep. 14, 2023

Related U.S. Application Data

(63) Continuation of application No. 17/692,738, filed on Mar. 11, 2022, now Pat. No. 11,595,221.

(51) Int. Cl.
*H04L 12/18* (2006.01)
*H04N 7/14* (2006.01)
(Continued)

(52) U.S. Cl.
CPC ........ *H04L 12/1827* (2013.01); *H04L 65/403* (2013.01); *H04L 65/80* (2013.01); *H04N 7/147* (2013.01)

(58) Field of Classification Search
CPC ........ H04L 65/80; H04L 65/403; H04N 7/147
See application file for complete search history.

(56) References Cited

U.S. PATENT DOCUMENTS

| 8,145,726 B1 | 3/2012 | Roche et al. |
| 9,372,731 B1 | 6/2016 | Marr et al. |

(Continued)

FOREIGN PATENT DOCUMENTS

| CN | 113923441 A | 1/2022 |
| JP | 2016-167676 A | 9/2016 |

(Continued)

OTHER PUBLICATIONS

Office Communication for U.S. Appl. No. 17/551,084 dated Mar. 14, 2022, pp. 1-52.
(Continued)

*Primary Examiner* — Kristie D Shingles
(74) *Attorney, Agent, or Firm* — John W. Branch; Branch Partners PLLC

(57) ABSTRACT

Embodiments are directed to verifying media stream quality for multiparty video conferences. A verification video may be generated based on verification goals for a video provided by a video service. A marker may be embedded in the verification video. A video conference may be established using video stations such that the video conference may be provided by a video service. The verification video may be streamed to a video input of each video station. The video may be streamed to a video output buffer of each video station such that the video provides a view of the video conference and such that the marker that corresponds to each video station may be included in the video. Video information may be captured from the video output buffer of the video stations. The video service may be classified based on the video information from each video station.

20 Claims, 11 Drawing Sheets

(51) Int. Cl.
*H04L 65/403* (2022.01)
*H04L 65/80* (2022.01)

(56) References Cited

U.S. PATENT DOCUMENTS

| | | | |
|---|---|---|---|
| 9,380,268 B2* | 6/2016 | Weber | H04L 65/1045 |
| 9,402,054 B2* | 7/2016 | Aaron | H04N 7/15 |
| 9,497,412 B1* | 11/2016 | Rosenberg | H04L 1/20 |
| 2004/0185785 A1 | 9/2004 | Mir et al. | |
| 2006/0271400 A1 | 11/2006 | Clements et al. | |
| 2014/0180715 A1 | 6/2014 | Phillips et al. | |
| 2014/0313282 A1* | 10/2014 | Ma | H04N 7/141 |
| | | | 348/14.09 |
| 2016/0308737 A1 | 10/2016 | Liu et al. | |
| 2017/0272485 A1 | 9/2017 | Gordon et al. | |
| 2019/0122760 A1 | 4/2019 | Wang | |
| 2019/0333613 A1 | 10/2019 | Zaidi et al. | |
| 2020/0222813 A1 | 7/2020 | Baszucki | |
| 2020/0357494 A1 | 11/2020 | Kadri et al. | |
| 2021/0076001 A1* | 3/2021 | Periyannan | H04L 65/403 |
| 2021/0314526 A1 | 10/2021 | Astarabadi et al. | |
| 2021/0319914 A1 | 10/2021 | Roh | |
| 2021/0358618 A1 | 11/2021 | Crocker | |
| 2021/0399911 A1 | 12/2021 | Jorasch et al. | |
| 2021/0400142 A1 | 12/2021 | Jorasch et al. | |
| 2021/0406841 A1 | 12/2021 | Chen et al. | |
| 2022/0165401 A1 | 5/2022 | Levitt | |
| 2022/0215970 A1 | 7/2022 | Trpkovski et al. | |

FOREIGN PATENT DOCUMENTS

| | | |
|---|---|---|
| WO | 2014018012 A1 | 1/2014 |
| WO | 2016019227 A1 | 2/2016 |

OTHER PUBLICATIONS

Tan, Joseph et al., "From Telemedicine to E-Health: Uncovering New Frontiers of Biomedical Research, Clinical Applications & Public Health Services Delivery," The Journal of Computer Information Systems, 2002, vol. 42, No. 5, pp. 7-18.

Office Communication for U.S. Appl. No. 17/692,738 dated Jun. 13, 2022, pp. 1-9.

Office Communication for U.S. Appl. No. 17/551,084 dated Jul. 1, 2022, pp. 1-59.

Office Communication for U.S. Appl. No. 17/837,218 dated Aug. 12, 2022, pp. 1-17.

Office Communication for U.S. Appl. No. 17/551,084 dated Sep. 16, 2022, pp. 1-5.

Office Communication for U.S. Appl. No. 17/692,738 dated Oct. 4, 2022, pp. 1-10.

Office Communication for U.S. Appl. No. 17/551,084 dated Nov. 15, 2022, pp. 1-61.

Office Communication for U.S. Appl. No. 17/837,218 dated Nov. 17, 2022, pp. 1-20.

Office Communication for U.S. Appl. No. 17/692,738 dated Jan. 5, 2023, pp. 1-8.

Office Communication for U.S. Appl. No. 17/837,218 dated Feb. 9, 2023, pp. 1-5.

Office Communication for U.S. Appl. No. 17/551,084 dated Mar. 6, 2023, pp. 1-26.

Office Communication for U.S. Appl. No. 17/837,218 dated Mar. 9, 2023, pp. 1-7.

Office Communication for U.S. Appl. No. 17/837,218 dated Mar. 15, 2023, pp. 1-2.

Office Communication for U.S. Appl. No. 17/551,084 dated May 23, 2023, pp. 1-6.

Office Communication for U.S. Appl. No. 18/130,660 dated Jun. 14, 2023, pp. 1-16.

International Search Report and Written Opinion for International Patent Application No. PCT/US2023/013531 dated Jun. 6, 2023, pp. 1-7.

Office Communication for U.S. Appl. No. 17/551,084 dated Jul. 13, 2023, pp. 1-28.

* cited by examiner

VERIFYING MEDIA STREAM QUALITY FOR MULTIPARTY VIDEO CONFERENCES

CROSS-REFERENCE TO RELATED APPLICATIONS

This Utility Patent Application is a Continuation of U.S. Patent Application Ser. No. 17/692,738 filed on Mar.11, 2022, now U.S. Pat. No. 11,595,221 issued on Feb. 28, 2023, the benefit which is hereby claimed under 35 U.S.C. § 120 and the contents of which is further incorporated in entirety by reference.

TECHNICAL FIELD

The present invention relates generally to managing video conference services, and more particularly, but not exclusively, to verifying media stream quality for multiparty video conferences.

BACKGROUND

For a variety of reasons organizations or persons are becoming increasingly reliant on remote meetings conducted using video conference services. In some cases, organizations may integrate or embed video services that may be provided by one or more video service providers. Sometimes, organizations provide services to customers. In some cases, such services may rely in part on integrated/embedded video services. Often organizations use video services vendors to avoid building such services from scratch for use in their own services. Often this may be advantageous because the organization may focus on the subject matter domain of their own service and customers rather than spending resource developing their own video teleconference network. However, in some cases, while there may be advantages to employing third-party video platforms rather than building custom platforms, those advantages may come at the cost of quality assurance and performance transparency. For example, the quality assurance tools provided by third-party video teleconference service may be insufficient for some organizations or some applications. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
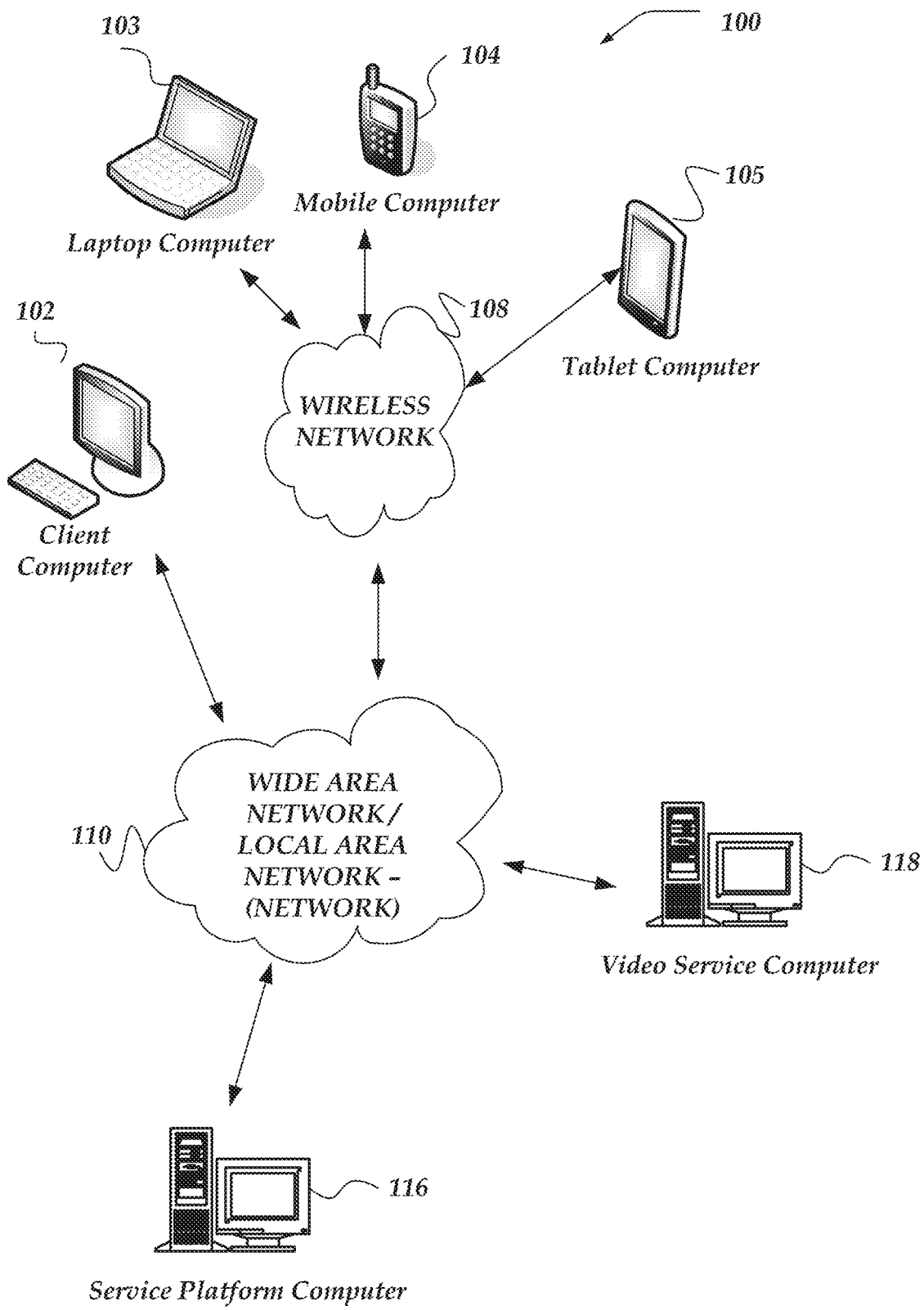
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, Python, R, Julia, JavaScript, Ruby, VBScript, Microsoft .NET™languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term, "configuration information" refers to information that may include rule based policies, pattern matching, scripts (e.g., computer readable instructions), or the like, that may be provided from various sources, including, configuration files, databases, user input, built-in defaults, or the like, or combination thereof. In some cases, configuration information may include or reference information stored in other systems or services, such as, configuration management databases, Lightweight Directory Access Protocol (LDAP) servers, name services, public key infrastructure services, or the like.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to verifying media stream quality for multiparty video conferences over a network. In one or more of the various embodiments, a verification video may be generated based on one or more verification goals for a video provided by a video service.

In one or more of the various embodiments, a marker may be embedded in the verification video such that the marker includes an identifier of for one or more frames of the verification video.

In one or more of the various embodiments, a video conference may be established using one or more video stations such that the video conference may be provided by a video service that may be separate from the one or more video stations.

In one or more of the various embodiments, the verification video may be streamed to a video input of each video station.

In one or more of the various embodiments, the video may be streamed to a video output buffer of each video station such that the video provides a view of the video conference and such that the marker that corresponds to each video station may be included in the video.

In one or more of the various embodiments, video information may be captured from the video output buffer of the one or more video stations such that the video information may be associated with the video and each video station and such that the video information includes the marker and one or more frames of the video.

In one or more of the various embodiments, the video service may be classified based on the video information from each video station.

In one or more of the various embodiments, one or more reports that include one or more results of the classification may be generated.

In one or more of the various embodiments, capturing the video information from the video output buffer of the one or more video stations may include, capturing one or more of a rendering of the video in a display buffer, a frame of the video, a snippet that includes more than one frame of the video, or the like.

In one or more of the various embodiments, capturing the video information from the video output buffer of the one or more video stations may include: determining one or more metrics associated with each video station that corresponds to the video output buffer such that the one or more metrics include one or more of a display resolution, a display type, an operating system identifier, an available amount of general purpose memory, an amount of available video memory, a type of available processor unit, a type of available graphics processor unit, or the like.

In one or more of the various embodiments, providing the verification video may include: determining one or more characteristics that include one or more of a video resolution, a color range, an amount of video noise, or a lighting condition; generating the verification video to simulate the one or more characteristics; providing the generated verification video; or the like.

In one or more of the various embodiments, classifying the video service based on the video information from each video station may include: determining one or more values for one or more metrics such that the one or more metrics may include one or more of latency between the one or more video stations, video frame drops, output resolution, color range, or the like; negatively classifying the video service for each of the one or more values that may be outside of a predetermined range of values; positively classifying the video service for each of the one or more values that may be within the predetermined range of values.

In one or more of the various embodiments, capturing the video information from the video output buffer of the one or more video stations may include: storing one or more portions of the video information at the one or more video stations; and in response to an expiry of a timer or a local storage amount threshold being exceeded, providing the one or more portions of the video information to a verification engine that may be arranged to classify the one or more portions of the video information.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, service platform computer 116, video service computer 118 or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, service platform computer 116, video service computer 118, or other computers.

Client computers 102-105 may further be configured to include a client application that enables an end-user to log into an end-user account that may be managed by another computer, such as service platform computer 116, video service computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, results provided by service platform computer 116, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, service platform computer 116, video service computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of service platform computer 116 is described in more detail below in conjunction with FIG. 3. Although FIG. 1 illustrates service platform computer 116 and video service computer 118 as a single computer, the innovations or embodiments are not so limited. For example, one or more functions of service platform computer 116, video service computer 118, or the like, may be distributed across one or more distinct network computers. Moreover, in one or more embodiments, service platform computer 116 or video service computer 118 may be implemented using a plurality of network computers. Further, in one or more of the various embodiments, service platform computer 116 or video service computer 118 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
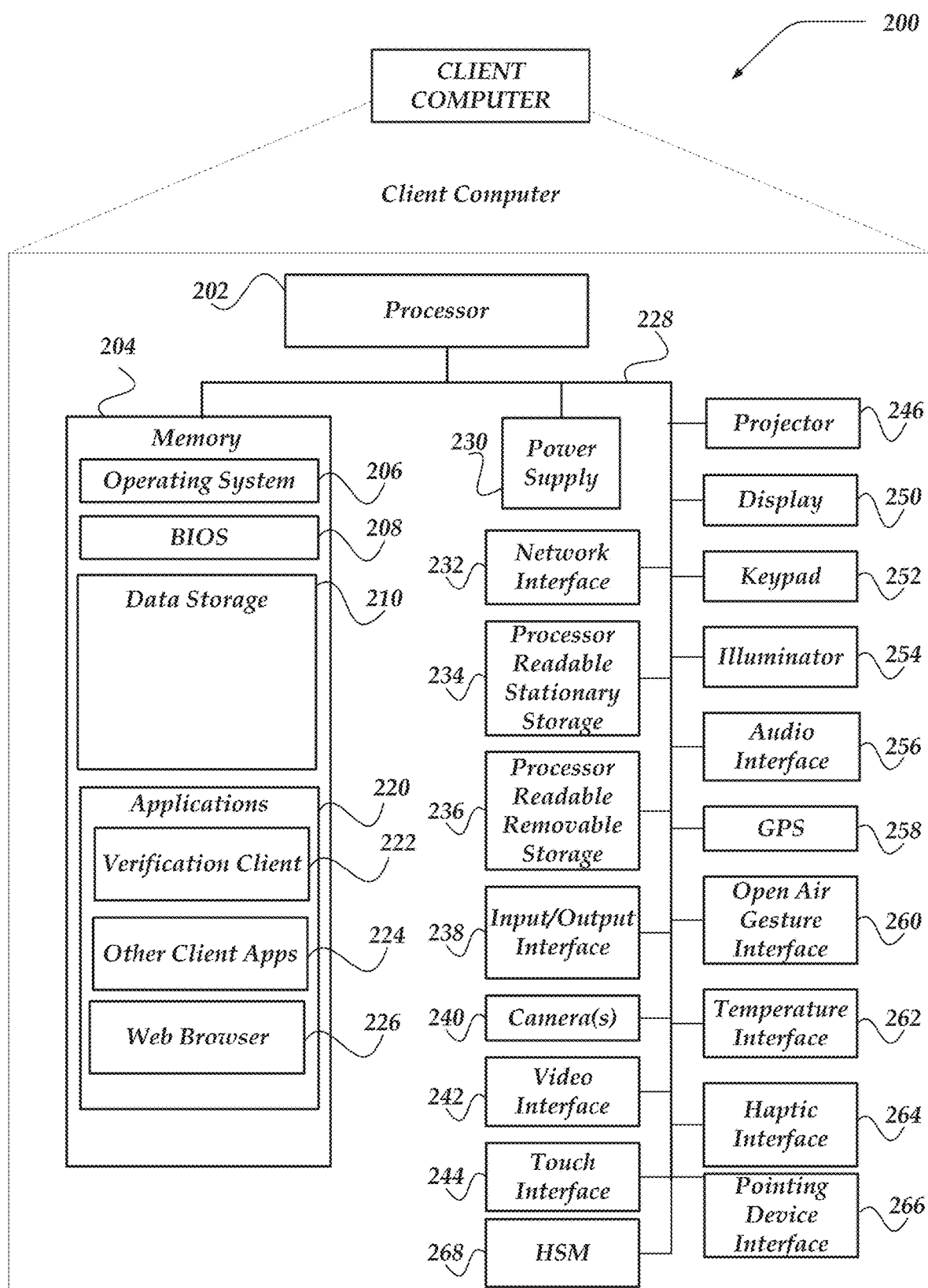
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX®, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, video verification client 222, other client applications 224, web browser 226, or the like. Client computers may be arranged to exchange communications, such as, queries, searches, messages, notification messages, event messages, alerts, performance metrics, log data, API calls, or the like, combination thereof, with healthcare service platforms. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
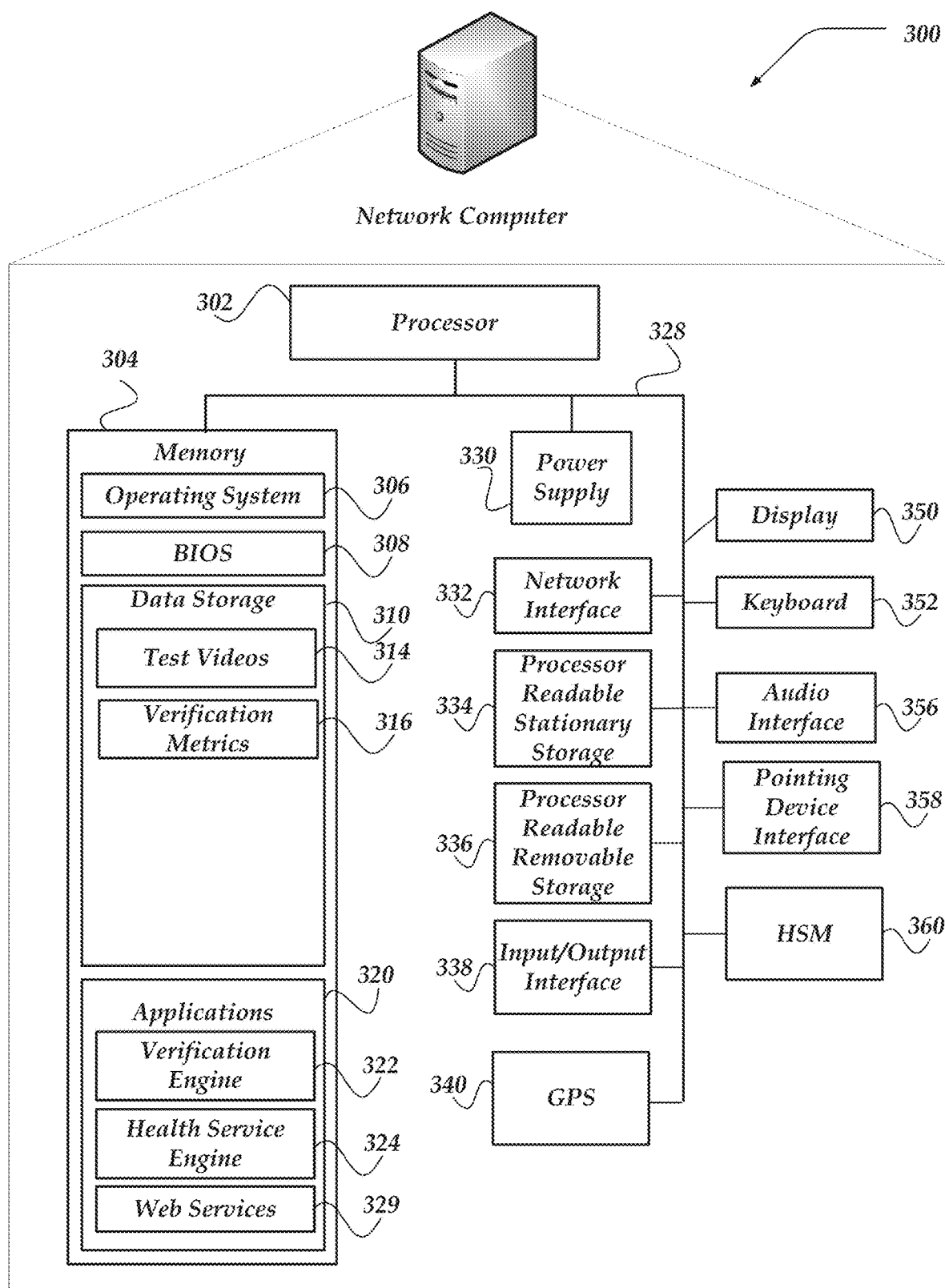
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of service platform computer 116 or video service computer 118 of FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

In at least one of the various embodiments, applications, such as, operating system 306, verification engine 322, health service engine 324, web services 329, or the like, may be arranged to employ geo-location information to select one or more localization features, such as, time zones, languages, currencies, calendar formatting, or the like. Localization features may be used when scheduling/visit information, provider availability, patient preferences, user-interfaces, generating reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's IOS® operating system. The operating system may include, or interface with a Java virtual machine (JVM) or other run-time engines that enable control of hardware components or operating system operations via application programs executed the JVM or other run-time execution engines.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, test videos 314, verification metrics 316, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include verification engine 322, health service engine 324, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, verification engine 322, health service engine 324, web services 329, or the like, may be operative in a cloud-based computing environment. In one or more of the various embodiments, these applications, and others, that comprise a video verification platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to verification engine 322, health service engine 324, web services 329, or the like, may be provisioned and de-commissioned automatically.

Also, in one or more of the various embodiments, verification engine 322, health service engine 324, web services 329, or the like, may be located in virtual servers running in a cloud-based computing environment rather than being tied to one or more specific physical network computers. Likewise, in some embodiments, one or more of verification engine 322, health service engine 324, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
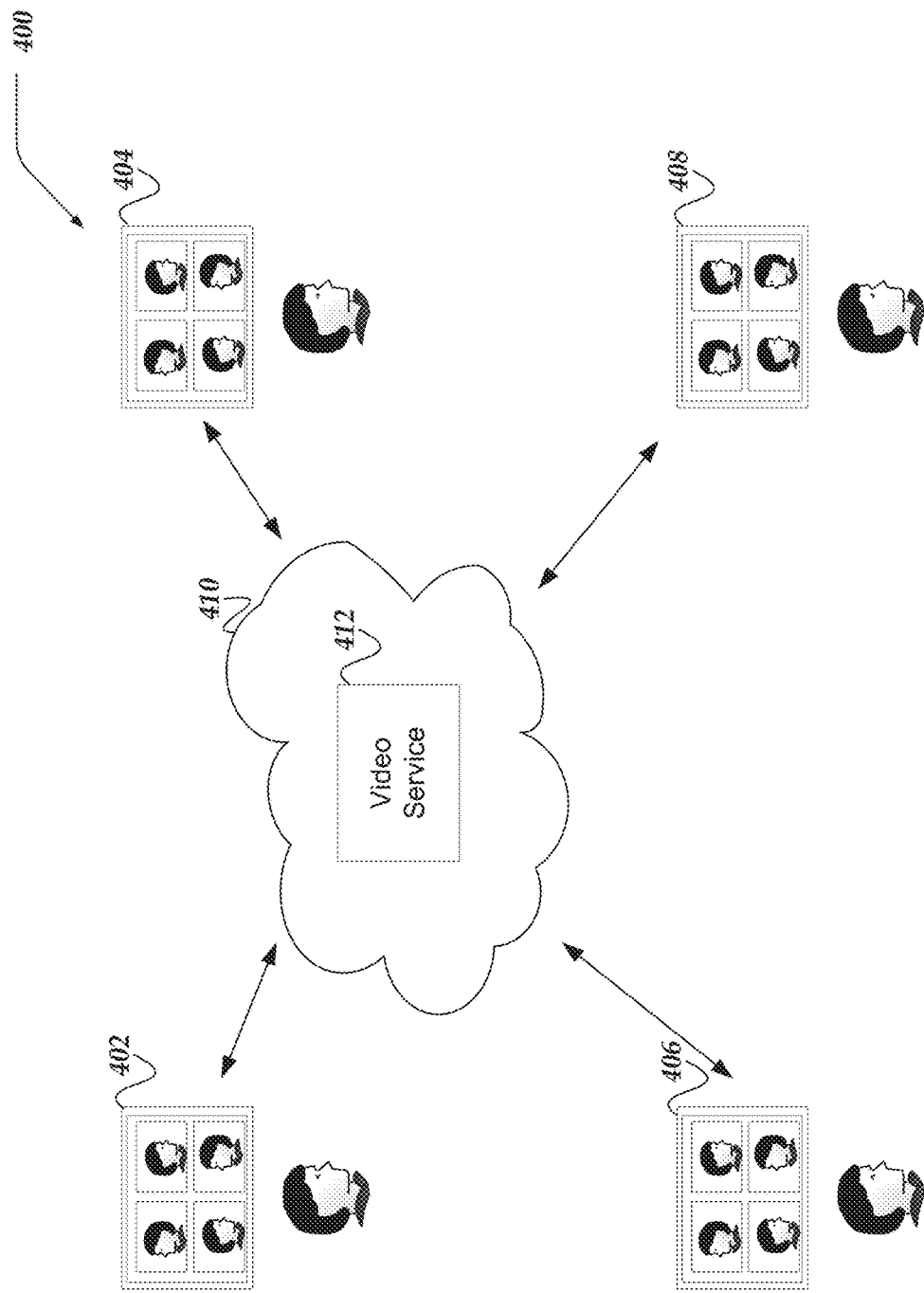
FIG. 4 illustrates a logical architecture of a system for verifying media stream quality for multiparty video conferences in accordance with one or more of the various embodiments.

FIG. 4 illustrates a logical architecture of system 400 for verifying media stream quality for multiparty video conferences in accordance with one or more of the various embodiments. In some cases, multiparty video conferencing may enable two or more persons to remotely engage in a meeting that include video and audio. In this example, video conference client 402, video conference client 404, video conference client 406, and video conference client 408 represent four parties to a video conference. In this example, each video conference client is capturing video and audio from a person and broadcasting it to other parties in the video conference. In this example, the video conference clients may be configured to merge the media streams from each client into one stream the incorporates the individual streams from the clients. In this example, a stream that merges the streams from all four video conference clients is shown as being presented to each client. One of ordinary skill in the art will appreciate that various video services may support different configurations/behaviors such as only showing the person that is talking, emphasizing the person that may be speaking by using a large area of the screen for the speaker while still showing some or all of the other participants in smaller portions of the displays. Likewise, in some cases, video services may enable one or more of the participants to 'share' their client computer screen such that some or all of information/documents displayed on their screen are shown to each participant.

In some cases, video service providers may facilitate video conferences. In this example, the video conference clients may employ network 410 to establish one or more network connections with video service 412. Accordingly, in this example, video service 412 represents a cloud-based video service. In some cases, video services may be retail oriented or consumer facing such that they provide their services directly to users. However, in some cases, other organizations may offer services that include video conferencing as part of a larger offering, such as, tele-medicine services, or the like. In some cases, these organizations may contract with video services to provide some or all of the video conferencing support necessary for supporting the offerings of the organization. Accordingly, in some cases, video services provided by a third-party service provided may be integrated with another organization's service to provide a seamless experience to consumers. For example, in some embodiments, an organization may provide an application that enables video services by embedding a plugin, a library, or module provided by a third-party video service provider.

Accordingly, in some embodiments, if a consumer has a negative experience with the video service that is integrated into an offering of another organization, they may expect the organization providing the overall integrated service to resolve those issues even though the organization providing the integrated service may not have visibility to some or all details of the video service. Thus, in some embodiments, the organization may be disabled from verifying or troubleshooting their customer's complaints because the video service that may be the source of the customer's complaint does not provide sufficient transparency or tooling to enable the organization to diagnose or resolve the customers video issues.

Further, in some embodiments, organizations and video services may enter into contracts that include a service level agreement (SLA). Accordingly, in some cases, organizations may be disabled from determining if the SLA is followed because the video service may not provide sufficient transparency or tooling to identify or classify ongoing problems or intermittent problems that may be occurring with the video services.

Figure 5:
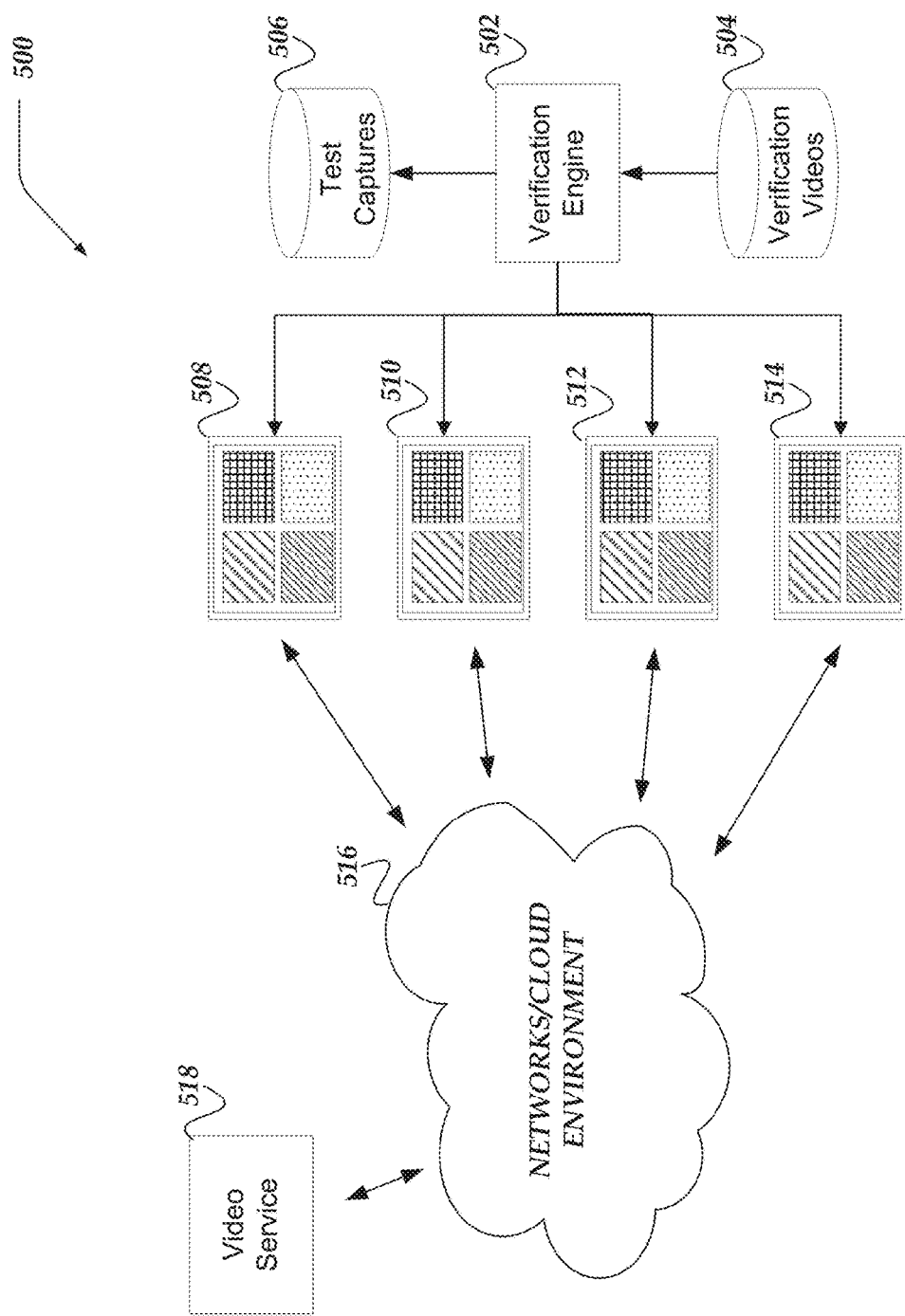
FIG. 5 illustrates a logical schematic of a system for verifying media stream quality for multiparty video conferences in accordance with one or more of the various embodiments.

FIG. 5 illustrates a logical schematic of system 500 for verifying media stream quality for multiparty video conferences in accordance with one or more of the various embodiments. In one or more of the various embodiments, system 500 may be arranged to enable organizations that rely on embedded or integrated video services to evaluate or verify the quality of video services they may rely on. Accordingly, in some embodiments, systems, such as, system 500 may be comprised of various components including such as, verification engine 502, verification video data store 504, test capture data store 506, two or more video stations, such as, video station 508, video station 510, video station 512, video station 514, or the like.

In one or more of the various embodiments, the video stations may be arranged to connect over one or more networks, such as, network 516 to a video service, such as, video service 518 that may provide video teleconferencing services. In some embodiments, video services, such as, video service 518 may be hosted in a cloud computing environment.

In one or more of the various embodiments, video stations, such as, video station 508, or the like, may be configured to employ the same video conference configuration as an application that embeds or integrates with the video service. Also, in some embodiments, video stations may be customized test platforms that may include one or more features or characteristics that are directed to verifying media stream quality for multiparty video conferences. Further, in some embodiments, the video stations may be actual instances of the organization's application that embed the video service. For example, in some embodiments, video stations may be health care applications that support remote video visits. In other cases, the video stations may be web applications hosted in standard web browsers, or the like, that may be directed to verifying media stream quality for multiparty video conferences separately from the complete application provided by the organization to its own customers.

In one or more of the various embodiments, verification video data store 504 may be arranged to include a collection of pre-made videos that may be specifically arranged to for verifying media stream quality for multiparty video conferences. As described in more detail below, verification videos may be arranged to include encoded markers (e.g., QR codes) that may include or correspond to information about the particular verification video. Likewise, in some embodiments, one or more verification videos may simulate different types of video sources, such as, high resolution sources, low resolution sources, gray scales sources, color sources, noisy sources, or the like. Also, in some embodiments, one or more verification videos may be created to represent or simulate various recording environments, such as, low light environments, or the like.

Accordingly, in one or more of the various embodiments, verification videos may be arranged to include various features that may represent or simulate environments or conditions that may be of interest to an organization. In one or more of the various embodiments, one or more of the verification videos may be generated to represent different types of video conference environments or conditions that may be similar to environments or conditions that may be representative of the environments or conditions experienced by actual users.

In one or more of the various embodiments, verification engines may be arranged to stream the verification videos into the video stations such that the video streams appear to originate from a conventional video source, such as, a web camera, video camera, or the like. In one or more of the various embodiments, the same verification video may be streamed to multiple video stations at the same time.

In one or more of the various embodiments, verification engines may be arranged to periodically capture information, such as, screen captures, video frames, video snippets, or the like, from the one or more video stations. In some embodiments, verification engines may be arranged to store capture information in a test capture data store, such as, data store 506. Accordingly, in some embodiments, the capture information may provide a snapshot of how the video service was performing at the various video stations.

In one or more of the various embodiments, verification engines may be arranged to trigger capture events for some or all video stations at the same time.

In one or more of the various embodiments, one or more video stations may be deployed in different geographic regions. Accordingly, in some embodiments, video service quality may be evaluated or compared at different geographic locations.

Likewise, in some embodiments, one or more video stations may be configured to have different network environments, such that, tests may be configured to evaluate how different network environment characteristics, such as, bandwidth, latency, stability, packet drops, or the like, may impact video service quality. For example, in some embodiments, verification engines may be arranged to evaluate how a video service may perform if network packets may be dropped, network bandwidth is temporarily throttled, connections reset, or the like.

Figure 6:
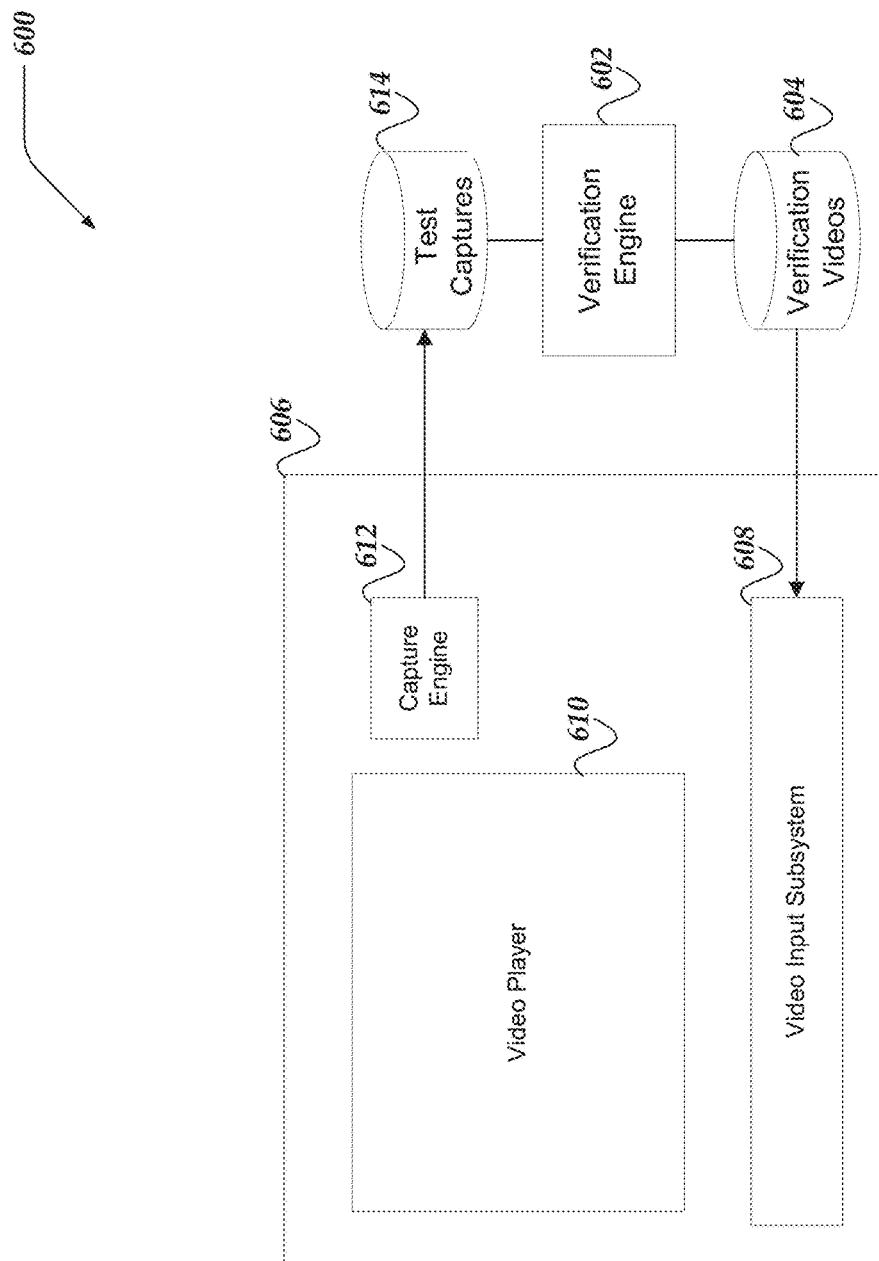
FIG. 6 illustrates a logical schematic of a system for verifying media stream quality for multiparty video conferences in accordance with one or more of the various embodiments.

FIG. 6 illustrates a logical schematic of system 600 for verifying media stream quality for multiparty video conferences in accordance with one or more of the various embodiments. In one or more of the various embodiments, system 600 includes verification engine 602, verification videos data store 604, video station 606, video stream subsystem 608, video player 610, capture engine 612, test captures data store 612, or the like.

In this example, for some embodiments, verification engine 602 may be arranged to direct that verification video data store 604 provides a verification video to video station 606. In one or more of the various embodiments, verification engines may be arranged to stream verification videos to a video stream input subsystem that may forward the verification video stream to a video service as if the stream is being collected from a live video camera.

In one or more of the various embodiments, video player 610 may be conventionally connected to the video service via a conventional API or interface provided by the video service. For example, video players hosted on video stations may be arranged to connect to video services using a link (e.g., HTTPS, RTP, RTPS, or the like) that enables multi-party teleconferences using the video service that is being evaluated. Typically, video service providers may provide one or more conventional mechanisms that provide users access to their services. One of ordinary skill in the art will appreciate the organizations that integrate with video service providers may provide one or more mechanisms for connecting with the service or initiating and conducting multi-party video conferences.

In one or more of the various embodiments, verification engines may be configured to execute a video verification session. In some embodiments, verification engines may be arranged to generate verification session profiles for a test run. In some embodiments, a verification session profile may include labels or identities for one or more verification videos, such as, session identifiers, customer identity, timestamps, test configuration settings (e.g., HD video, SD video, simulated drop outs, or the like), capture rules/criteria, or the like.

In one or more of the various embodiments, verification engines may be arranged to execute a verification session by selecting the appropriate verification video and streaming it into the video inputs of the one or more video station. In some embodiments, verification engines may be arranged to automatically establish a multi-party video conference with a video service using login credentials, or the like, that may be defined in the session profile. Also, in some embodiments, video stations may be previously connected to the video service being verified.

Accordingly, in some embodiments, the video player for each video station involved in the verification session may begin playing the video conference. Note, the video stream shown in the video player may be provided by the video service based on the verification videos streamed to the video inputs of each video station. So, in some embodiments, the video stations may receive a video stream from the video service based on the verification video streamed from each video station. Accordingly, in some embodiments, the multiparty video conference may be simulated.

In one or more of the various embodiments, capture engines, such as, capture engine 612 may be arranged to capture one or more video frames or video snippets directly from video player 610. In one or more of the various embodiments, capture engines may be arranged to determine the timing for collecting captures based on information included in the verification session profile. For example, in some embodiments, capture engines may be configured to capture video frames from the video player every 15 seconds, or the like.

Accordingly, in some embodiments, verification engines may be arranged to store captured video frames or captured video streams in a data store, such as, test captures data store 612 for subsequent analysis. Further, in some embodiments, capture engines or verification engines may be arranged to update the verification session profile to include an index of the captured video frames or video snippets. In some embodiments, this index may include timestamps, file names, file path information, checksums, or the like, that may correspond to the one or more captured video frames or video snippets. In some embodiments, this index may include information associated with the captured video, such as, frame numbers, or the like, that may be extracted from the meta data embedded in the verification videos.

Figure 7:
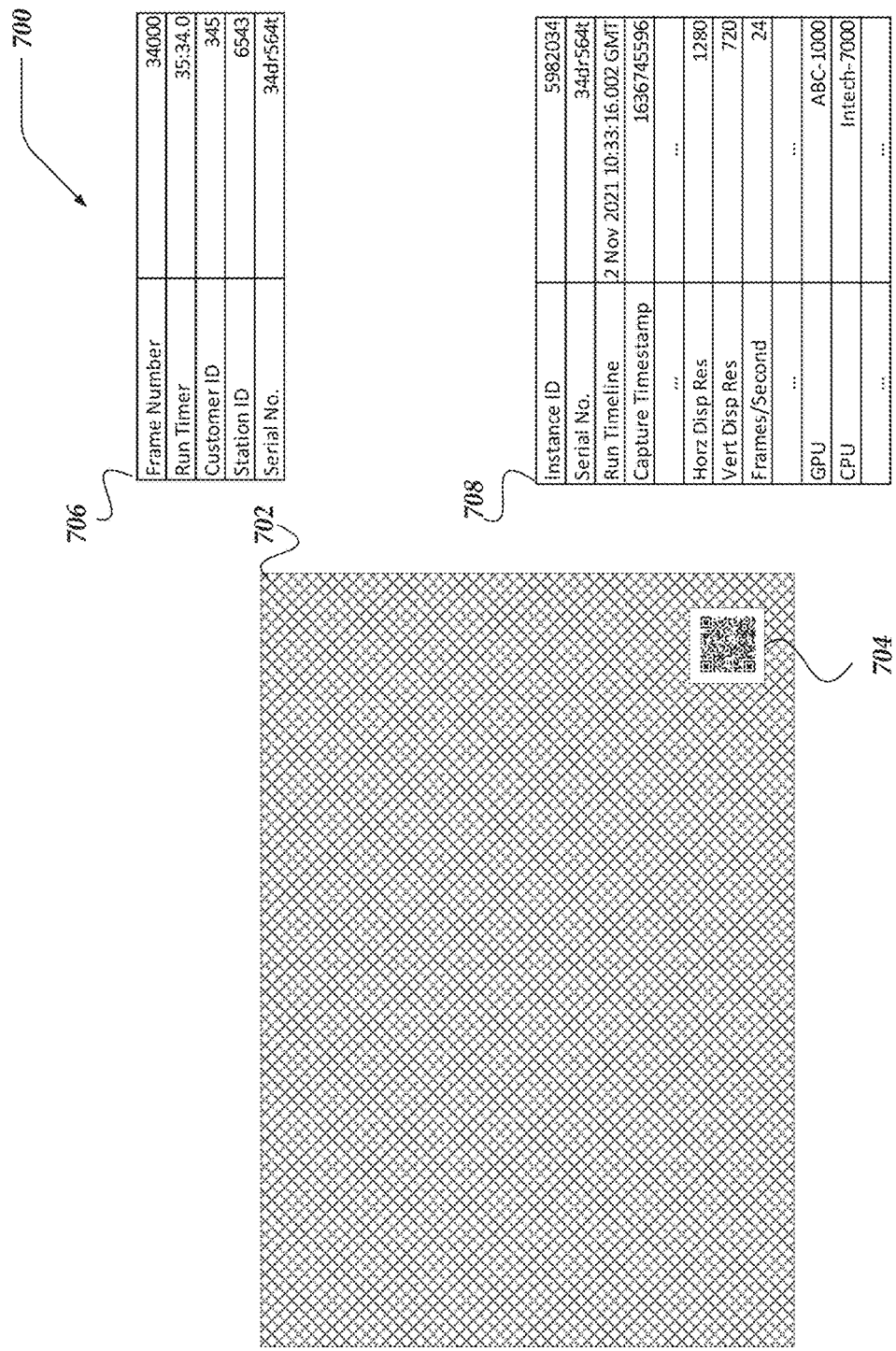
FIG. 7 illustrates a logical schematic of a verification video for verifying media stream quality for multiparty video conferences in accordance with one or more of the various embodiments.

FIG. 7 illustrates a logical schematic of verification video 700 for verifying media stream quality for multiparty video conferences in accordance with one or more of the various embodiments.

In one or more of the various embodiments, verification engines may be arranged to generate one or more verification videos that may be streamed to video stations/video players. In some embodiments, verification videos may be pre-made videos that include content that may be relevant to the goals of a particular verification test. Accordingly, in some embodiments, verification videos may be arranged to include various test patterns, color gradients, or the like, that may be useful for verifying one or more qualities of a video service.

In one or more of the various embodiments, verification videos may be arranged include embedded or overlayed information that may be included in the video streams that may be streamed to the video service. In some embodiments, the overlay information may be in the form of a QR code, or the like, that embeds or references information about verification video or other information about the verification session.

In one or more of the various embodiments, verification engines may be arranged to generate verification videos that include a different QR code for each frame of the video such that each frame may be uniquely determined. In some embodiments, verification videos may be marked with a synchronization counter value that may be considered a proxy for frame counters. For example, if a verification video may be transcoded into different transport protocols or video protocols the definition of when a frame begins of ends may vary. Thus, in some cases, the 'frame counter' embedded in a QR code may be considered time-based counter that may correspond the full frame rate expected for the verification video, such as, 30 frames-per-second. Thus, in this example, the counter value may be incremented each 1/30 of second rather than corresponding to a frame as defined in the underlying media protocols or transport protocols.

In one or more of the various embodiments, one or more QR codes, or the like, such as, QR code 704 may be embedded into the verification video in advance. Also, in some embodiments, one or more QR codes may be overlaid on the verification video as it is streamed to the video stations. Thus, in some embodiments, each video station may be streamed with QR codes that may be customized for a particular verification session.

In this example, for some embodiments, data structure 706 may represent an example of information that may be embedded in a QR code overlaid on a video frame.

In some embodiments, if a verification engine or capture engine captures video frames or video snippets from a video player of a video stations, the captured video frames or snippets may include the QR code. Accordingly, in some embodiments, the QR codes may enable post-session analysis to verify one or more qualities or characteristics of the video services. For example, if the test session is using four video stations, a synchronized capture event may capture a video frame from each video station at the same time. Thus, in this example, the QR codes of the four captured video frames may be employed to determine if the video viewed in the video players may be in sync for comparing frame counters, or the like.

Further, in some embodiments, capture engines, or the like, may be arranged to collect additional information associated with the video quality, such as, video station network address, display resolution, CPU/GPU type/versions, operating system type/versions, or the like. Accordingly, in some embodiments, verification engines may be arranged to generate data structures, such as, data structure 708 for storing additional information. Also, in some embodiments, data structures, such as, data structure 708 may be employed to record information about the capture event. For example, a capture event record may include a reference to the captured video data that corresponds to the capture event.

Generalized Operations

FIGS. 8-11 represent generalized operations for verifying media stream quality for multiparty video conferences in accordance with one or more of the various embodiments. In one or more of the various embodiments, processes 800, 900, 1000, and 1100 described in conjunction with FIGS. 8-11 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based or containerized environment. However, embodiments are not so limited and various combinations of network computers, client computers, or the like may be utilized. Further, in one or more of the various embodiments, the processes described in conjunction with FIGS. 8-11 may be used for verifying media stream quality for multiparty video conferences in accordance with at least one of the various embodiments or architectures such as those described in conjunction with FIGS. 4-7. Further, in one or more of the various embodiments, some or all of the actions performed by processes 800, 900, 1000, and 1100 may be executed in part by verification engine 322, health service engine 324, or the like, running on one or more processors of one or more network computers.

Figure 8:
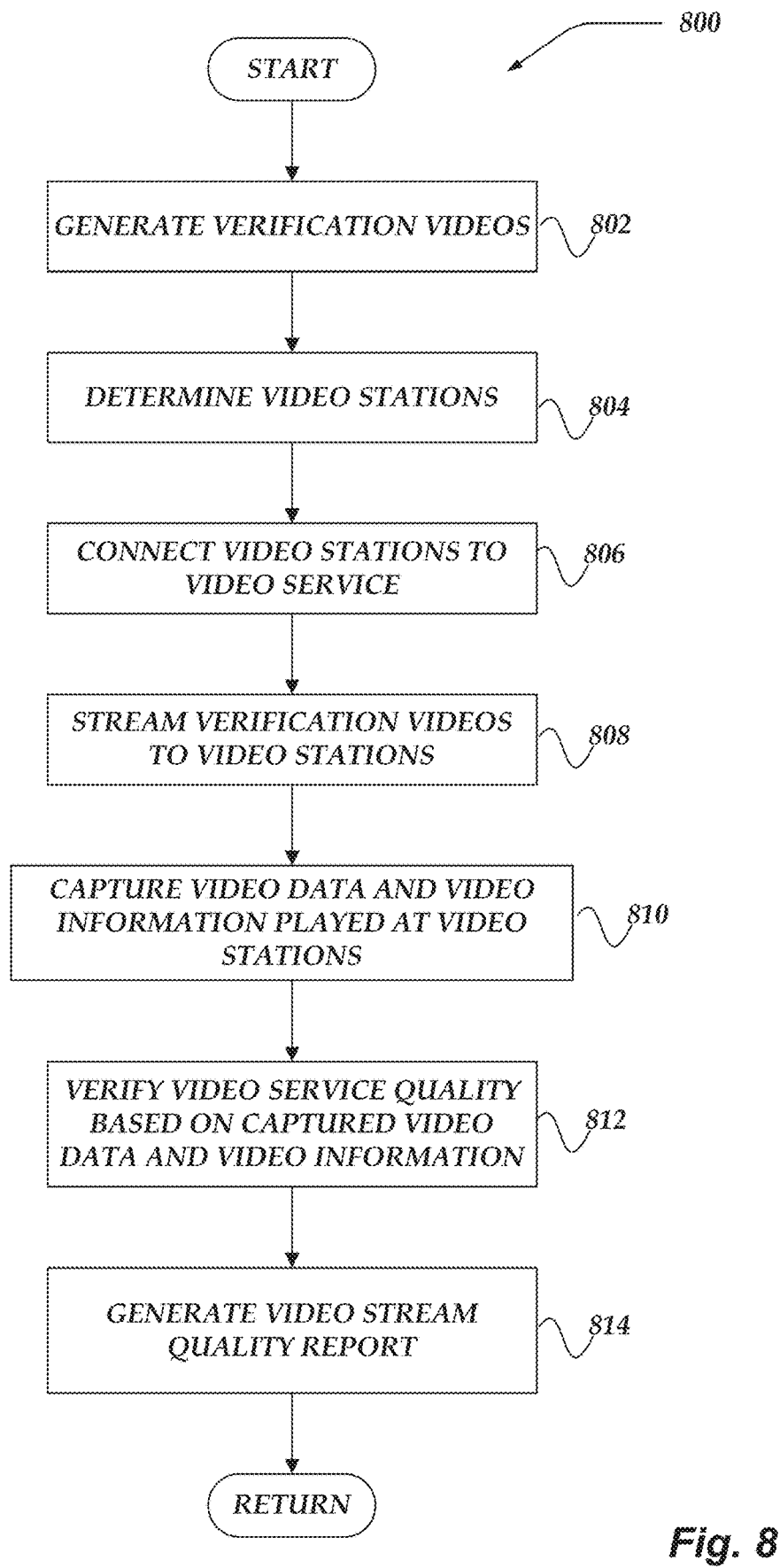
FIG. 8 illustrates an overview flowchart of a process for verifying media stream quality for multiparty video conferences in accordance with one or more of the various embodiments.

FIG. 8 illustrates an overview flowchart of process 800 for verifying media stream quality for multiparty video conferences in accordance with one or more of the various embodiments. After a start block, at block 802, in one or more of the various embodiments, verification engines may be arranged to generate one or more verification videos. As described above, verification videos may be generated that include one or more tests patterns, color scheme, calibration patterns, or the like. Further, in some embodiments, verification information embedded or referenced by a QR code, or the like, may be embedded in the verification videos.

In some embodiments, one or more characteristics of a verification video may be determined based on rules or instructions defined in configuration information to account for local circumstances or local requirements.

At block 804, in one or more of the various embodiments, verification engines may be arranged to determine one or more video stations. In some embodiments, verification engines may be configured to identify one or more video stations. In some embodiments, the video stations may be identified or referenced based on their network address or other identifiers. In some embodiments, verification engines may be arranged to be manually connected to one or more video stations.

At block 806, in one or more of the various embodiments, verification engines may be arranged to connect the one or more video stations to a video service. In one or more of the various embodiments, verification engines may be arranged to employ the services of a video service to establish a multi-party video verification session that includes the one or more video stations. In some embodiments, establishing the connection to the video service may include providing pre-issued credentials, URLs, or the like, that may be employed to connect the one or more video stations with the video services such that they join the same video conference.

In one or more of the various embodiments, different video services may require or support different protocols for establishing a connection, creating a video meeting, or joining a video meeting. Accordingly, in some embodiments, verification engines may be arranged to employ one or more scripts, instructions, keys, or the like, provided via configuration information to establish the connections between the video service and the video stations.

At block 808, in one or more of the various embodiments, verification engines may be arranged to stream verification videos to the one or more video stations. In one or more of the various embodiments, verification engines may be arranged to simultaneously stream the verification video to each of the video stations. As described above, the verification video may be streamed into a video input subsystem that presents the verification video stream as if it was coming from a live source such as video camera or webcam. For example, the video input subsystem may register itself as a USB webcam with operating system of the video stations.

At block 810, in one or more of the various embodiments, verification engines may be arranged to capture video data and video information played at video stations. As described above, video stations may include a video player that displays the video stream as it is provided from the video service. Accordingly, in some embodiments, the video player may be playing the video of the multi-party video conference that may be based on the verification videos played by the video stations.

In one or more of the various embodiments, capture engines running on the video stations may periodically capture "screenshots" of the video players for each video station. In one or more of the various embodiments, capture engines may be configured to capture one or more video frames or one or more video snippets (video data) from each video station. In some cases, capture engines may be arranged to capture video data from different video stations at different times.

In one or more of the various embodiments, verification engine may be arranged to store captured video data in a capture video data store. In some embodiments, one or more video stations may be remotely located such that real-time storage of the video data may be disadvantageous because of bandwidth limitations. Accordingly, in some embodiments, in some cases, capture engines may be arranged to upload video data to the capture data store if the streaming of the verification video may be completed. Or, in some embodiments, capture engines may be arranged to periodically provide the capture information or video data. For example, in some embodiments, capture engines may be arranged to upload capture information, including video captures, every 5 minutes. Likewise, for example, capture engines may be arranged to upload capture information if a local storage amount threshold may be exceeded such as 30 MB, 100 MB, or the like.

Also, in some embodiments, capture engines may be arranged to capture operating environment information, such as, display resolution, display type, operating system specifications, CPU type/version, GPU type/version, network bandwidth, amount/type of general purpose memory, amount/type of dedicated graphics memory, or the like. In some cases, for some embodiments, the particular environment characteristics collected may be determined based on one or more rules, instructions, or the like, provided via configuration information.

At block 812, in one or more of the various embodiments, verification engines may be arranged to verify video service quality based on the captured video data and video information. In some embodiments, verification engines may be arranged to evaluate captured video data to determine if the video service may meet one or more criteria. In some embodiments, the particular criteria may vary depending on the local circumstances or local requirements. In some embodiments, criteria for evaluating video services may include, video synchronization (audio or video), latency, stuttering, frame drops, resolution, clarity, or the like.

Accordingly, in some embodiments, verification engines may be arranged to determine some of the information for the verifying session quality from the QR codes embedded in the captured video data. For example, a frame counter/sync counter value may be compared for video data captured from different video stations to evaluate if the video service keeps the different stations synchronized within a tolerance range. Likewise, in some embodiments, test patterns included in the capture video data may be evaluated to determine video resolutions or video clarity at the different video stations.

In one or more of the various embodiments, verification engines may be arranged to evaluate the video service as video is captured from the various video stations. Thus, in some embodiments, verification engines may be arranged to abort a test session based on the video service failing to meet one or more criteria rather than continuing a potentially long running test session.

In one or more of the various embodiments, verification engines may be arranged to determine specific criteria, such as, threshold values, tolerance ranges, or the like, via configuration information to account for local circumstances or local requirements. Likewise, in some embodiments, verification engines may be arranged to employ one or more plugins, libraries, rules, instructions, or the like, provide via configuration information to enable one or more criteria evaluations. For example, one or more organizations or applications may require unique or customized criteria, accordingly, a plugin or library may be provided to evaluate the unique or customized criteria.

At block 814, in one or more of the various embodiments, verification engines may be arranged to generate reports that include information regarding the quality of the video service. In one or more of the various embodiments, verification engines may be arranged to generate one or more interactive reports that display information determined based on the verification session for the video services. In some embodiments, reports may include one or more statistical reports, visualizations, or the like, that highlight one or more shortcomings (if any) in the quality of video service. Likewise, in some embodiments, reports may include one or more metrics that may be employed to categorize or grade the video service based on the test session.

In some embodiments, reports may include user interface dashboards that enable users to drill-down to the captured video data associated with errors, defects, or shortcoming determined during the test session.

Next, in one or more of the various embodiments, control may be returned to a calling process.

Figure 9:
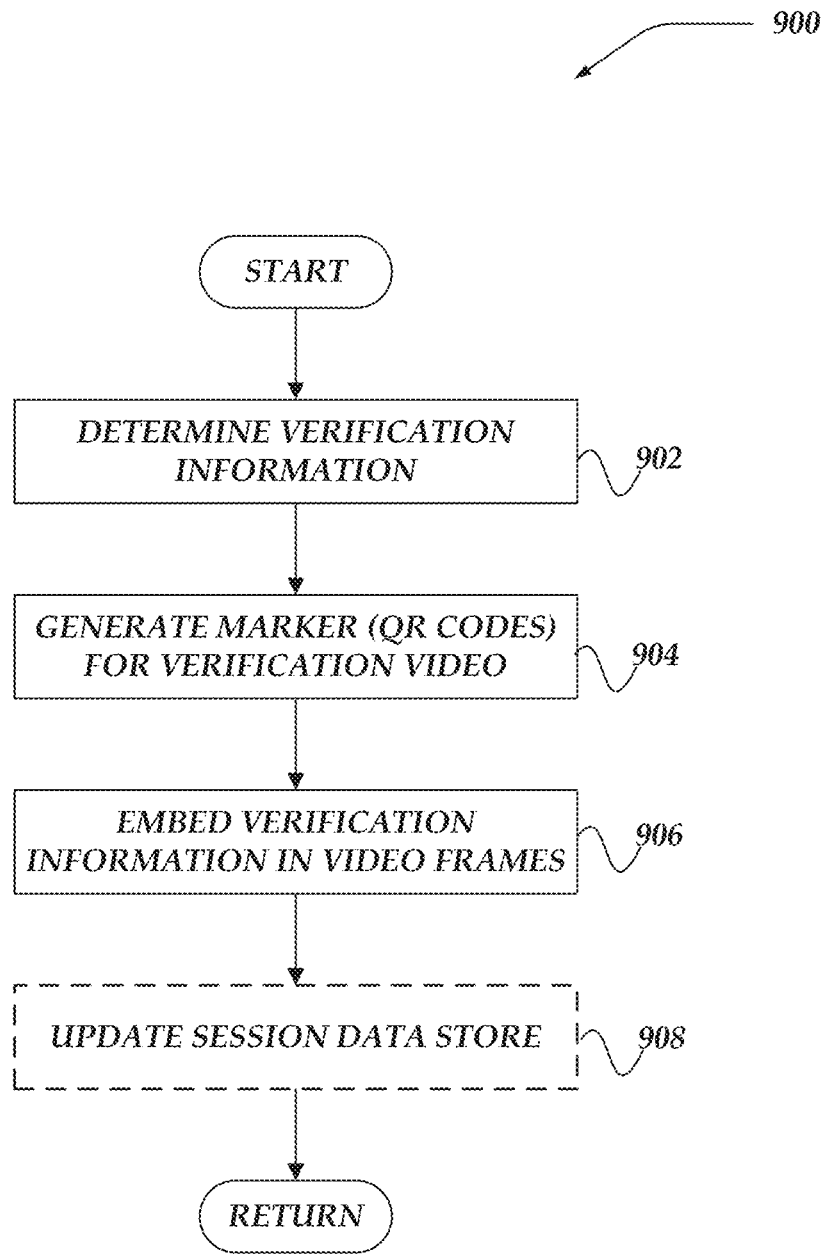
FIG. 9 illustrates a flowchart of a process for verifying media stream quality for multiparty video conferences in accordance with one or more of the various embodiments.

FIG. 9 illustrates a flowchart of process 900 for verifying media stream quality for multiparty video conferences in accordance with one or more of the various embodiments. After a start block, at block 902, in one or more of the various embodiments, verification engines may be arranged to determine verification information. In one or more of the various embodiments, verification engines may be arranged to provide one or more user interfaces, configuration files, or other configuration information that enable organizations to define/declare verification information to associate with verification videos. As described above, in some embodiments, verification information may include various fields of data, such as, frame/sync counters, video identifiers, session identifiers, video descriptions, video labels, or the like. For example, in some embodiments, verification information may include a serial number for the verification video, or the like.

At block 904, in one or more of the various embodiments, verification engines may be arranged to generate markers (QR codes) for verification videos. In one or more of the various embodiments, verification engines may be arranged to generate one or more different types of marks that may be suitable for carrying the verification information and embedding it into the verification videos. In some cases, verification engines may be arranged to generate QR codes to embed the verification information. However, other encoding/marker schemes may be employed if they are sufficiently resistant to data loss or image distortion. For example, information encoded using Level H QR codes may remain readable even if there is a 30% data loss in the QR code. Accordingly, in some embodiments, verification information encoded in the QR codes may be resistant to the effects of lossy distribution that may be introduced by video services or lossy video capture from the video players.

At block 906, in one or more of the various embodiments, verification engines may be arranged to embed the verification information into the video frames. In one or more of the various embodiments, verification engines may be configured to embed verification information markers into verification videos at one or more particular locations in the video frame (e.g., right lower corner). Accordingly, in some embodiments, verification engines may encode the verification information marker (QR code) and embed it in the verification video. In some embodiments, each frame of the verification video may be tagged with an embedded mark such as a QR code. Accordingly, in some embodiments, verification engines may be arranged to embed verification information marks in each frame of a verification video in advance of the execution of a verification session. Note, in some embodiments, verification engines may be arranged to embed a verification engine information mark based on a synchronization counter or timing based counter rather than trying to discern actual 'video frames' from a given transport protocol or media protocol.

Also, in some embodiments, verification engines may be arranged to embed some or all of the verification information marks in real-time while the verification video is being streamed to the video stations. Thus, in some embodiments, information specific to a video station or verification session may be embedded into the verification videos on the fly.

At block 908, in one or more of the various embodiments, optionally, verification engines may be arranged to update session data store. In one or more of the various embodiments, verification engines may be arranged to store information associated with a verification session in a data store or database. In some embodiments, information stored in such data stores may be linked to one or more keys or identifiers that may be included in the verification marks (e.g., QR codes) that may be embedded in the verification video. In some embodiments, capture engines that capture verification video data may be arranged to collect information from or about the video station or video player. In some embodiments, this type of information may include operating environment information (e.g., environment variable values), resource metrics (e.g., memory, CPU utilization, or the like), operating system information, CPU information, GPU information, timestamps, display metrics, or the like. In some embodiments, verification engines or capture engines may be arranged to determine the specific additional metrics/value (if any) to collect based on configuration information to account for local circumstances or local requirements.

Note, this block is indicated as being optional because in some cases for some embodiments verification engines or capture engines may be configured to not capture additional information related to video stations or video players.

Next, in one or more of the various embodiments, control may be returned to a calling process.

Figure 10:
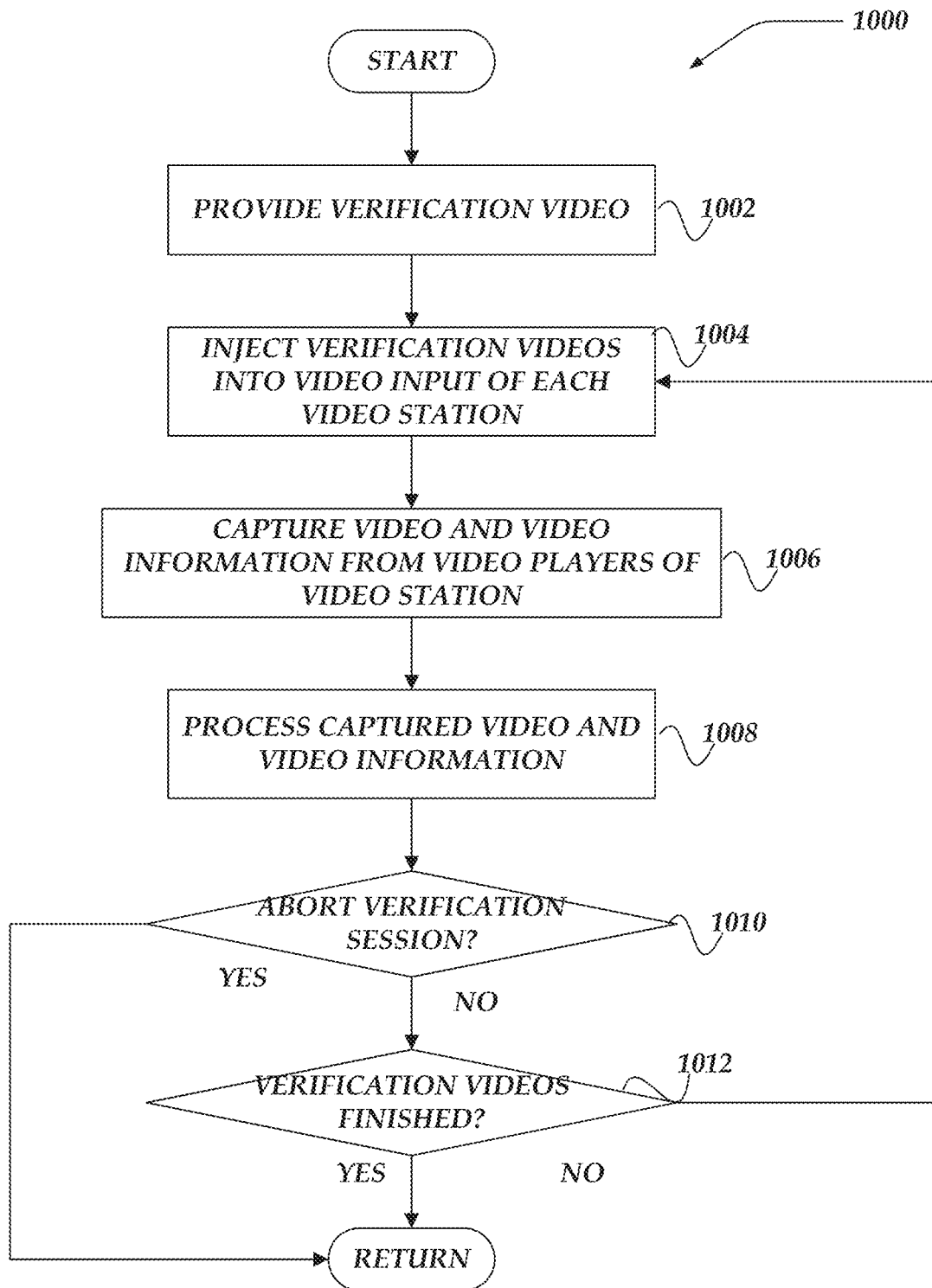
FIG. 10 illustrates a flowchart of a process for verifying media stream quality for multiparty video conferences in accordance with one or more of the various embodiments.

FIG. 10 illustrates a flowchart of process 1000 for verifying media stream quality for multiparty video conferences in accordance with one or more of the various embodiments. After a start block, at block 1002, in one or more of the various embodiments, verification engines may be arranged to provide a verification video. As described above, one or more verification videos that enable one or more criteria to be evaluated for one or more video services. In some cases, the verification video may be pre-made to support one or more different verification sessions. Also, in some embodiments, verification engines may be arranged to embed verification information into verification videos as they are streamed to video stations.

In one or more of the various embodiments, verification engines may be arranged to provide a different verification video for one or more of the video stations used for the verification session. For example, a verification session may be directed evaluating if (or how well) a video service may be support video sources having different resolutions, aspect ratios, color schemes, or the like. Accordingly, in some embodiments, different verification videos having different resolutions, frame rates, color depth, dynamic ranges, or the like, may be provided to compare how a video service may handle different conditions in a multiparty video session.

At block 1004, in one or more of the various embodiments, verification engines may be arranged to inject the verification video into the video input of each video station. In one or more of the various embodiments, verification engines may be arranged to stream the verification video(s) into two or more video stations. In one or more of the various embodiments, verification engines may be communicatively couple to each video station. In some embodiments, verification engines may be arranged to couple to the one or more video stations over a network. Also, in some embodiments, verification engines may be arranged to be coupled with video stations using USB connections, HDMI connections, or the like. In some embodiments, verification engines may be arranged to emulate one or more hardware (e.g., USB, HDMI, or the like) connections.

In one or more of the various embodiments, verification engines may provide a video input subsystem that may be installed on virtual (cloud instances) or physical computers that may be video stations for a verification session. In some embodiments the video input subsystem may act as a video input device, or the like, to enable to verification videos to be streamed to the video stations.

Accordingly, in some embodiments, video stations may treat the stream verification videos as if they were coming from a local webcam or other video source.

At block 1006, in one or more of the various embodiments, verification engines may be arranged to capture video frames or other video information from the video players of the video stations. In one or more of the various embodiments, capture engines (or verification engines) may be arranged to capture video data from video players that may be running on the video stations. In some embodiments, capture engines may be integrated with an application that is hosting the video player for a video station. For example, in some embodiments, if a video station is configured to host video players in a web browser, capture engines may be included in a customized web-browser or web-browser plugin. Also, in some embodiments, capture engines may be arranged to execute on the video station adjacent as the video player. Accordingly, in some embodiments, capture engines may be arranged to execute 'screenshot' captures of video frames of video snippets that are played in the video player.

Accordingly, in some embodiments, capture engines may be arranged to capture video data based on one or more rules, instructions, schedules, or the like, to provide regular or periodic captured video data. Also, in some embodiments, capture engines may be arranged to capture one or more metrics that provide of snapshot of the operating environment of the video station.

In one or more of the various embodiments, captured video data and capture environment metrics may be associated together based on serial numbers or other identifiers included in the verification information marks (QR codes) that may be present in the captured video data.

At block 1008, in one or more of the various embodiments, verification engines may be arranged to process the captured video frames and video information. In some embodiments, verification engines may be arranged to evaluate the captured video data or operating environment metrics at the conclusion of the verification video. Also, in some embodiments, verification engines may be arranged to process captured video data and captured operating environment metrics on-the-fly rather than delaying evaluation until the completion of the verification video.

Accordingly, in some embodiments, verification engines may be arranged to evaluate the video data or other metrics as the captured video data or other session metrics are collected and stored in a data store.

At decision block 1010, in one or more of the various embodiments, if the verification session may be aborted, control may be returned to a calling process; otherwise, control may flow to decision block 1012.

In one or more of the various embodiments, verification engines may be configured to abort a verification session based on one or more conditions or criteria. In some embodiments, verification engines may be arranged to enable organizations to set various conditions, threshold values, tolerance ranges, or the like, that may be used to determine if a verification session should be aborted. For example, if a video service fails to keep the video at the video stations synchronized within a defined tolerance range, verification engines may be configured to abort a verification session.

Also, in one or more of the various embodiments, verification engines may be configured to generate one or more alerts or notifications that may correspond to one or more detected defects or performance shortcomings. Accordingly, in some embodiments, verification engines may enable test operators to view a particular video station or video player in response to one or more metrics falling below standard or otherwise out of tolerance range.

In some embodiments, verification engines may be arranged to provide user interfaces that enable users to directly browse captured video data or observe live views of one or more video players. Accordingly, in some cases, in response to one or more notifications or alerts, verification engines may be arranged to enable one or more users to navigate directly to a portion of the captured video data or to a video player showing live video as the undesirable behavior/performance occurs. Thus, in some embodiments, verification engines may be arranged to enable users to abort or cancel pending verification sessions based on the occurrence of one or more notifications.

At decision block 1012, in one or more of the various embodiments, if the verification session may be completed, control may be returned to a calling process; otherwise, control may loop back to block 1004.

In one or more of the various embodiments, verification engines may be arranged to continue streaming verification videos to video stations until the end of the video may be reached or the verification session may be otherwise canceled. In some embodiments, verification engines may be arranged to provide user interfaces that enable one or more users to intervene and cancel a pending verification session. Also, in some embodiments, verification engines may be arranged to run the verification session until the end of the verification video may be reached.

Note, in some embodiments, verification engines may be configured to stream the same verification video more than one time in a given video service. For example, a verification session may be configured to loop through the verification video two or more times in one verification session.

Next, in one or more of the various embodiments, control may be returned to a calling process.

Figure 11:
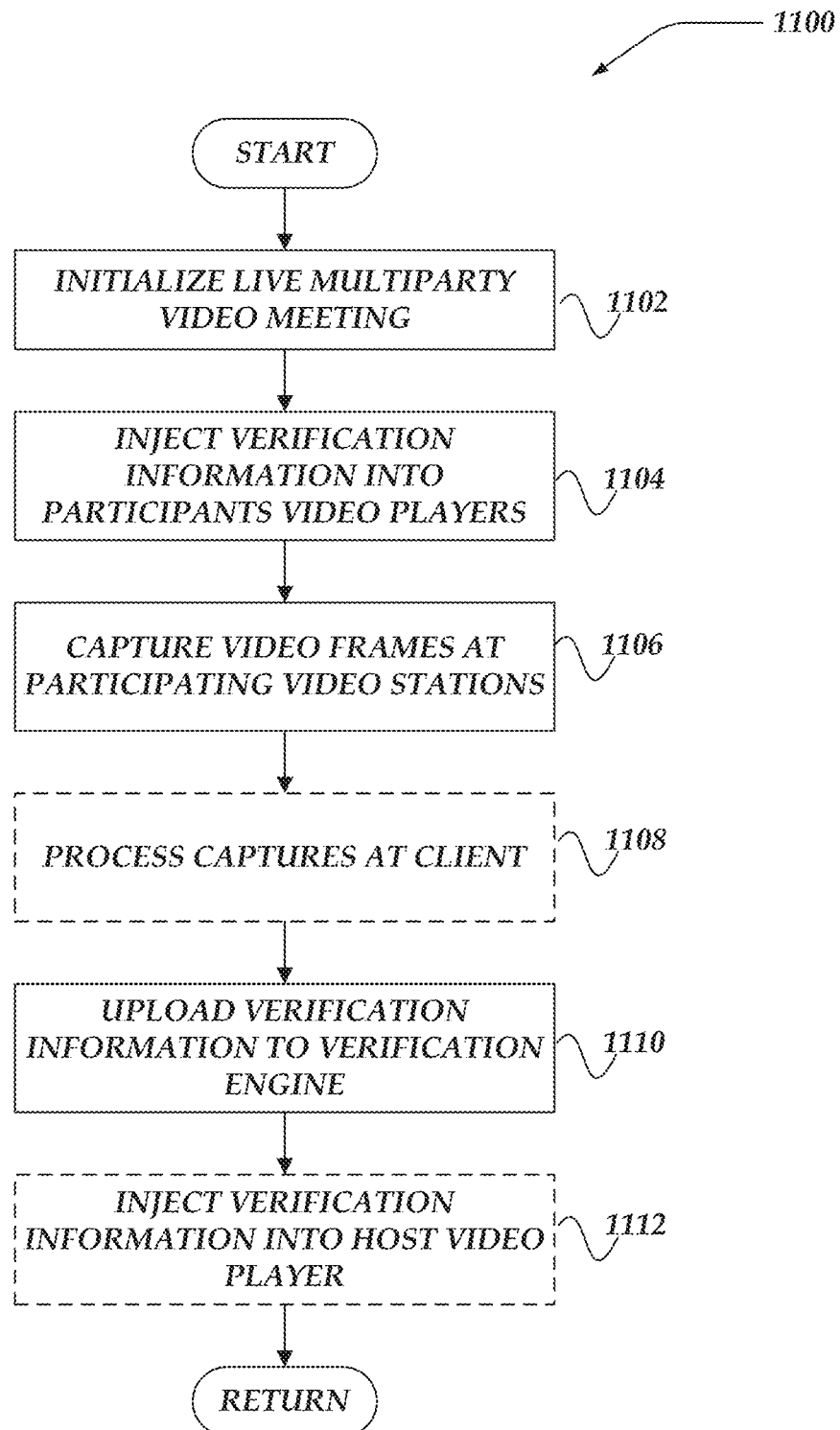
FIG. 11 illustrates a flowchart of a process for verifying media stream quality for multiparty video conferences in accordance with one or more of the various embodiments.

FIG. 11 illustrates a flowchart of process 1100 for verifying media stream quality for multiparty video conferences in accordance with one or more of the various embodiments. After a start block, at block 1102, in one or more of the various embodiments, a health service engine, such as, health service engine 324, may be arranged to initialize a live multi-party video meeting. As described herein, various type of industries or services may integrate with third-party video services. One example may be health provider organizations that provide remote patient visits that include video teleconferencing features. In some cases, a health service platform may provide apps or websites that enable patients and providers to connect via video teleconferencing. Note, features related to scheduling appointments, selecting providers, or the like, may be considered to be provided by one or more healthcare service engines.

Accordingly, in some embodiments, if a remote video visit is established, at least the patient and the provider may be connected in a multi-party video session. In some cases, additional parties such as, interpreters, legal guardians, or the like, may be included in the remote visit as well.

One of ordinary skill in the art will appreciate that verifying media stream quality for multiparty video conferences may be relevant for many types of industries or contexts that may rely on video services as part of their applications or offerings. Accordingly, innovations described herein are anticipated to be applicable to many applications and are not limited to healthcare services.

At block 1104, in some embodiments, verification engines may be arranged to inject verification information in one or more video players of the participants of the video meeting. In one or more of the various embodiments, video stations for each participant may comprise a variety of different applications, including smart phone applications, web applications, desktop applications, tablet computer applications, or the like. However, each of the different types of applications may be customized to integrate with video service that may be provide multi-party video conference services. Accordingly, in some embodiments, the component described for video station 606 in FIG. 6 may be assumed to present or available. For example, smart phone apps may be arranged to embed video player libraries provided or supported by a video service. Likewise, rich web applications may embed video players, or the like, that may execute locally in a web browser, and so on. Further, for example, web browser plug-ins or add-ons may provide one or more features described for video station 606, such as, video input subsystems, capture engines, or the like.

At block 1106, in one or more of the various embodiments, capture engines may be arranged to capture video frames or video information at participating video stations. As described above, capture engines may be installed at each video station. In some embodiments, applications that users employ to participate in the multiparty video conference may include a built-in capture engine, such as, a customer client application that embeds the video player and the capture engine in the same application. Also, for example, in some embodiments, if the video player is hosted in a web browser, the web browser may include a plugin or other tool/system that provides the capture engine.

At block 1108, in one or more of the various embodiments, optionally, capture engines may be arranged to process the captured video at the video stations. In some cases, capture engines may be arranged to evaluate one or more metrics associated with the captured video data or the video station. In some embodiments, capture engines may be arranged to compare one or more metrics with one or more conditions, threshold values, tolerance ranges, or the like, at the video station rather than being limited to storing the capture video data or performance metrics.

In one or more of the various embodiments, one or more of the video stations may be designated as a meeting leader or meeting host. Accordingly, in some embodiments, the meeting host video station may be arranged to include specialized capture engines or user interfaces that may be part of verifying video service performance metrics while a meeting may be occurring in real-time.

Accordingly, in some embodiments, a meeting host video station may be arranged to evaluate the quality of the multi-party media by capturing video associated with the different parties that is display in its local video player. Accordingly, in some embodiments, verification engines or capture engines at the host station may be arranged to identify if video quality of one or more of the meeting participants falls below one or more standards or requirements.

In one or more of the various embodiments, verification engines may be arranged to enable additional user interface features to be displayed on the meeting host video station, such as, one or more warning indicators, quality metric summaries, or the like. For example, if the video quality for a meeting participant drops below standard, a colored symbol or shape may be displayed (overlaid) on the portion of the video that corresponds to the participant experiencing low quality video server.

Also, in some embodiments, one or more indicators or warnings may be display in an informational user interface panel that may be visible to the meeting host or other administrator that may be monitoring the session.

At block 1110, in one or more of the various embodiments, capture engines may be arranged to upload the verification information collected for video stations to a verification engine. As described herein, capture engines may be arranged to communicate captured video data or video service performance information to a verification engine. In some embodiments, capture engines may be arranged to forward captured information to an intermediate data store, message queue, event queue, or the like.

At block 1112, in one or more of the various embodiments, optionally, verification engines may be arranged to inject verification information into meeting host video player. In some embodiments, verification engines may be arranged to communicate information to a video station of a meeting host or meeting administrator. In some embodiments, the verification information may be visible to the host user or administrator rather than being made available to other participants in the meeting. In some embodiments, verification engines may be arranged to overlay verification information on the video player used by meeting host users or other administrative users. Also, in some embodiments, verification information, video quality information, video performance status information, or the like, may be displayed in a user interface such as a display panel or side-panel on the video station of the meeting host users or other administrative users.

Next, in one or more of the various embodiments, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing video applications over a network using one or more processors that are configured to execute instructions that cause actions, comprising:
   generating a verification video based on one or more of a plurality of pre-made videos configured to verify one or more qualities for video conferencing and local requirements;
   establishing a video conference with a video service for one or more video stations, wherein the verification video is streamed to each of the one or more video stations, and wherein video information is included in each instance of the streamed verification video to separately identify the one or more video stations and one or more frames of the verification video;
   capturing a display of an instance of the verification video generated by each of the one or more video stations; and
   generating one or more reports that include one or more results of a classification of the one or more qualities of the video conference provided by the video service to each of the one or more video stations.

2. The method of claim 1, wherein the video conference further comprises:
   employing the video service to separately stream the video conference to the one or more video stations.

3. The method of claim 1, wherein the video information further comprises:
   providing one or more encoded markers for display in the verification video streamed to a particular video station, wherein the encoded marker includes one or more of a bar code or a quick response (QR) code.

4. The method of claim 1, further comprising:
   employing a verification engine to verify the one or more qualities of the video service based on the captured display of each instance of the verification video and the video information.

5. The method of claim 1, wherein capturing the display of the instance of the verification video further comprises:
   employing a client at each video station to capture the display of each instance of the verification video and the video information.

6. The method of claim 1, wherein the video information is included in each instance of the verification video, further comprises:
   injecting the video information into each verification video at one of a host video station or each video station participating in the video conference.

7. The method of claim 1, wherein generating the verification video, further comprises:
   pre-determining one or more qualities for video conferencing that include one or more of a video resolution, a color range, an amount of video noise, or a lighting condition;
   generating the plurality of pre-made videos to simulate the one or more pre-determined qualities; and
   employing one or more of the plurality of pre-made videos that simulate the one or more pre-determined qualities for generation of the verification video.

8. A network computer for managing video applications, comprising:
   a memory that stores at least instructions; and
   one or more processors that execute instructions that are configured to cause actions, including:
      generating a verification video based on one or more of a plurality of pre-made videos configured to verify one or more qualities for video conferencing and local requirements;
      establishing a video conference with a video service for one or more video stations, wherein the verification video is streamed to each of the one or more video stations, and wherein video information is included in each instance of the streamed verification video to separately identify the one or more video stations and one or more frames of the verification video;
      capturing a display of an instance of the verification video generated by each of the one or more video stations; and
      generating one or more reports that include one or more results of a classification of the one or more qualities of the video conference provided by the video service to each of the one or more video stations.

9. The network computer of claim 8, wherein the video conference further comprises:
   employing the video service to separately stream the video conference to the one or more video stations.

10. The network computer of claim 8, wherein the video information further comprises:
    providing one or more encoded markers for display in the verification video streamed to a particular video station, wherein the encoded marker includes one or more of a bar code or a quick response (QR) code.

11. The network computer of claim 8, further comprising:
    employing a verification engine to verify the one or more qualities of the video service based on the captured display of each instance of the verification video and the video information.

12. The network computer of claim 8, wherein capturing the display of the instance of the verification video further comprises:
    employing a client at each video station to capture the display of each instance of the verification video and the video information.

13. The network computer of claim 8, wherein the video information is included in each instance of the verification video, further comprises:
    injecting the video information into each verification video at one of a host video station or each video station participating in the video conference.

14. The network computer of claim 8, wherein generating the verification video, further comprises:
    pre-determining one or more qualities for video conferencing that include one or more of a video resolution, a color range, an amount of video noise, or a lighting condition;
    generating the plurality of pre-made videos to simulate the one or more pre-determined qualities; and
    employing one or more of the plurality of pre-made videos that simulate the one or more pre-determined qualities for generation of the verification video.

15. A processor readable non-transitory storage media that includes instructions for managing video applications, wherein one or more processors execute the instructions that are configured to cause actions, comprising
    generating a verification video based on one or more of a plurality of pre-made videos configured to verify one or more qualities for video conferencing and local requirements;
    establishing a video conference with a video service for one or more video stations, wherein the verification video is streamed to each of the one or more video stations, and wherein video information is included in each instance of the streamed verification video to separately identify the one or more video stations and one or more frames of the verification video;

capturing a display of an instance of the verification video generated by each of the one or more video stations; and generating one or more reports that include one or more results of a classification of the one or more qualities of the video conference provided by the video service to each of the one or more video stations.

16. The processor readable non-transitory storage media of claim 15, wherein the video conference further comprises:
employing the video service to separately stream the video conference to the one or more video stations.

17. The processor readable non-transitory storage media of claim 15, wherein the video information further comprises:
providing one or more encoded markers for display in the verification video streamed to a particular video station, wherein the encoded marker includes one or more of a bar code or a quick response (QR) code.

18. The processor readable non-transitory storage media of claim 15, further comprising:
employing a verification engine to verify the one or more qualities of the video service based on the captured display of each instance of the verification video and the video information.

19. The processor readable non-transitory storage media of claim 15, wherein the video information is included in each instance of the verification video, further comprises:
injecting the video information into each verification video at one of a host video station or each video station participating in the video conference.

20. The processor readable non-transitory storage media of claim 15, wherein generating the verification video, further comprises:
pre-determining one or more qualities for video conferencing that include one or more of a video resolution, a color range, an amount of video noise, or a lighting condition;

generating the plurality of pre-made videos to simulate the one or more pre-determined qualities; and employing one or more of the plurality of pre-made videos that simulate the one or more pre-determined qualities for generation of the verification video.

* * * * *